US010288303B2

(12) United States Patent
Yaegashi et al.

(10) Patent No.: US 10,288,303 B2
(45) Date of Patent: May 14, 2019

(54) ROOM AIR CONDITIONING SYSTEM (71) Applicant: Panasonic Intellectual Property Management Co., Ltd., Osaka (JP)

(72) Inventors: Masahiro Yaegashi, Gunma (JP); Shigemitsu Kamata, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 286 days.

(21) Appl. No.: 15/140,071

(22) Filed: Apr. 27, 2016

(65) Prior Publication Data

US 2016/0341438 A1 Nov. 24, 2016

(30) Foreign Application Priority Data

May 20, 2015 (JP) .................................. 2015-102565

(51) Int. Cl.
 *F24F 11/30* (2018.01)
 *F24F 11/79* (2018.01)
 (Continued)

(52) U.S. Cl.
 CPC .......... *F24F 1/0059* (2013.01); *F24F 1/0014* (2013.01); *F24F 1/0022* (2013.01);
 (Continued)

(58) Field of Classification Search
 CPC .... F24F 11/79; F24F 2120/10; F24F 2120/12; F24F 11/30; F24F 11/77; F24F 1/0059; F24F 1/0014; F24F 1/0022
 (Continued)

(56) References Cited

U.S. PATENT DOCUMENTS

2006/0254293 A1* 11/2006 Lee .......................... F24F 11/79
                                                     62/186
2008/0254734 A1* 10/2008 Uenaka ................. F24F 1/0007
                                                     454/256
(Continued)

FOREIGN PATENT DOCUMENTS

EP       2 865 959       4/2015
JP      2004-150731      5/2004
(Continued)

OTHER PUBLICATIONS

Extended European Search Report dated Oct. 4, 2016 in corresponding European Application No. 16170097.6.

*Primary Examiner* — Devon Russell
(74) *Attorney, Agent, or Firm* — Wenderoth, Lind & Ponack, L.L.P (57) ABSTRACT

A room air conditioning system includes a plurality of indoor units and a controller. Each of the plurality of indoor units includes: an air conditioner main body having a plurality of blow-off openings formed therein; a plurality of flaps rotatably that are disposed in the respective blow-off openings and that can independently change vertical angles of airflows; and a human body sensor that detects whether a person is present below a corresponding one of the plurality of indoor units. When at least one of the human body sensors in the plurality of indoor units detects the absence of a person in a state of selecting the airflow control, the controller causes a corresponding one of the indoor units that detects the absence to perform the temperature evenness control. This room air conditioning system successfully reduces unevenness of room temperature.

16 Claims, 8 Drawing Sheets (51) Int. Cl.
  *F24F 120/10*  (2018.01)
  *F24F 120/12*  (2018.01)
  *F24F 1/0059*  (2019.01)
  *F24F 1/0014*  (2019.01)
  *F24F 1/0022*  (2019.01)
  *F24F 1/00*    (2019.01)
  *F24F 13/02*   (2006.01)
  *F24F 13/20*   (2006.01)
  *F24F 110/10*  (2018.01)
  *F24F 11/77*   (2018.01)
  *F24F 11/89*   (2018.01)

(52) U.S. Cl.
  CPC .............. *F24F 11/30* (2018.01); *F24F 11/79* (2018.01); *F24F 11/77* (2018.01); *F24F 11/89* (2018.01); *F24F 13/0263* (2013.01); *F24F 13/20* (2013.01); *F24F 2001/0037* (2013.01); *F24F 2110/10* (2018.01); *F24F 2120/10* (2018.01); *F24F 2120/12* (2018.01)

(58) Field of Classification Search
  USPC ........................................................ 165/237
  See application file for complete search history.

(56) References Cited

U.S. PATENT DOCUMENTS

| | | | |
|---|---|---|---|
| 2011/0277982 A1* | 11/2011 | Kim | F24F 1/0007 165/237 |
| 2012/0174608 A1* | 7/2012 | Kumamoto | F24F 11/0078 62/186 |
| 2012/0288363 A1 | 11/2012 | Yumoto et al. | |
| 2013/0284417 A1* | 10/2013 | Taira | F24F 1/0033 165/237 |
| 2015/0136378 A1* | 5/2015 | Maeda | F24F 11/0034 165/237 |

FOREIGN PATENT DOCUMENTS

| | | | | |
|---|---|---|---|---|
| JP | 2007-32887 | | 2/2007 | |
| JP | 2011-099609 | | 5/2011 | |
| JP | 2011-185591 | | 9/2011 | |
| JP | 2011185591 A | * | 9/2011 | ............ F24F 1/0014 |
| JP | 2011-196666 | | 10/2011 | |
| JP | 2013-224755 | | 10/2013 | |
| JP | 5310792 B | | 10/2013 | |
| JP | 2015-021719 | | 2/2015 | |
| JP | 2016-138716 | | 8/2016 | |
| WO | 2011/093343 | | 8/2011 | |
| WO | 2011/099608 | | 8/2011 | |

* cited by examiner

ROOM AIR CONDITIONING SYSTEM

BACKGROUND OF THE INVENTION

1. Field of the Invention

The present invention relates to a room air conditioning system in an air conditioner, which includes at least four horizontal vanes (flaps) in blow-off openings and can independently change vertical angles of airflows.

2. Description of the Related Art

Unexamined Japanese Patent Publication No. 2011-099609 and Japanese Patent No. 5,310,792 disclose conventional examples of a configuration of an indoor unit in an air conditioner which is to be installed on the ceiling in a room.

The first indoor unit disclosed in PTL1 includes a controller and a human body sensor. If the human body sensor detects the presence of a person when the indoor unit starts a heating operation, the controller controls the horizontal flap in the blow-off opening that corresponds to the target area in which the detected person is present. In this way, the controller suppresses air from being directly blown into the person.

Similar to the controller in PTL1, human body sensors in the second indoor unit disclosed in PTL2 detect whether persons are present below the respective blow-off openings. If any of the human body sensors detects the presence of a person, the controller controls one of a plurality of vanes which corresponds to the target area in which the detected person is present such that air flows horizontally within this target area.

The human body sensor in the first indoor unit in PTL 1 has a rotatable opening section, which rotates when the human body sensor detects whether persons are present within the respective target areas. The above second indoor unit has a human body sensor assembly made up of the human body sensors that detect whether persons are present within the respective target areas.

Unfortunately, both the human body sensors in the first and second indoor units need to detect whether persons are present within as many as four target areas. In which case, the structure of the human body sensors may be complex and thus expensive.

SUMMARY OF THE INVENTION

The present invention provides a room air conditioning system that is capable of reducing unevenness of room temperature without directly blowing air into a person.

A room air conditioning system according to an aspect of the present invention includes: a plurality of indoor units to be installed on a ceiling; and a controller that causes the plurality of indoor units to perform airflow control and temperature evenness control. Each of the plurality of indoor units includes: an air conditioner main body; a plurality of flaps; and a human body sensor. A lower surface of the air conditioner main body has a periphery along which a plurality of blow-off openings are formed. The plurality of flaps are rotatably disposed in the respective blow-off openings and are capable of independently changing vertical angles of airflows. The human body sensor detects whether a person is present below a corresponding one of the plurality of indoor units. When at least one of the human body sensors in the plurality of indoor units detects the absence of a person with the airflow control being selected, the controller causes a corresponding one of the indoor units that detects the absence to perform the temperature evenness control.

According to the above configuration, when at least one of the human body sensors in the plurality of indoor units detects the absence of a person with the airflow control being selected, the controller causes a corresponding one of the indoor units that detects the absence to perform the temperature evenness control. In this way, the room air conditioning system can reduce unevenness of room temperature without blowing air directly into a person.

DETAILED DESCRIPTION OF THE PREFERRED EMBODIMENT

A description will be given below of a room air conditioning system according to some exemplary embodiments of the present invention, with reference to the accompanying drawings.

Exemplary Embodiment

Figure 1:
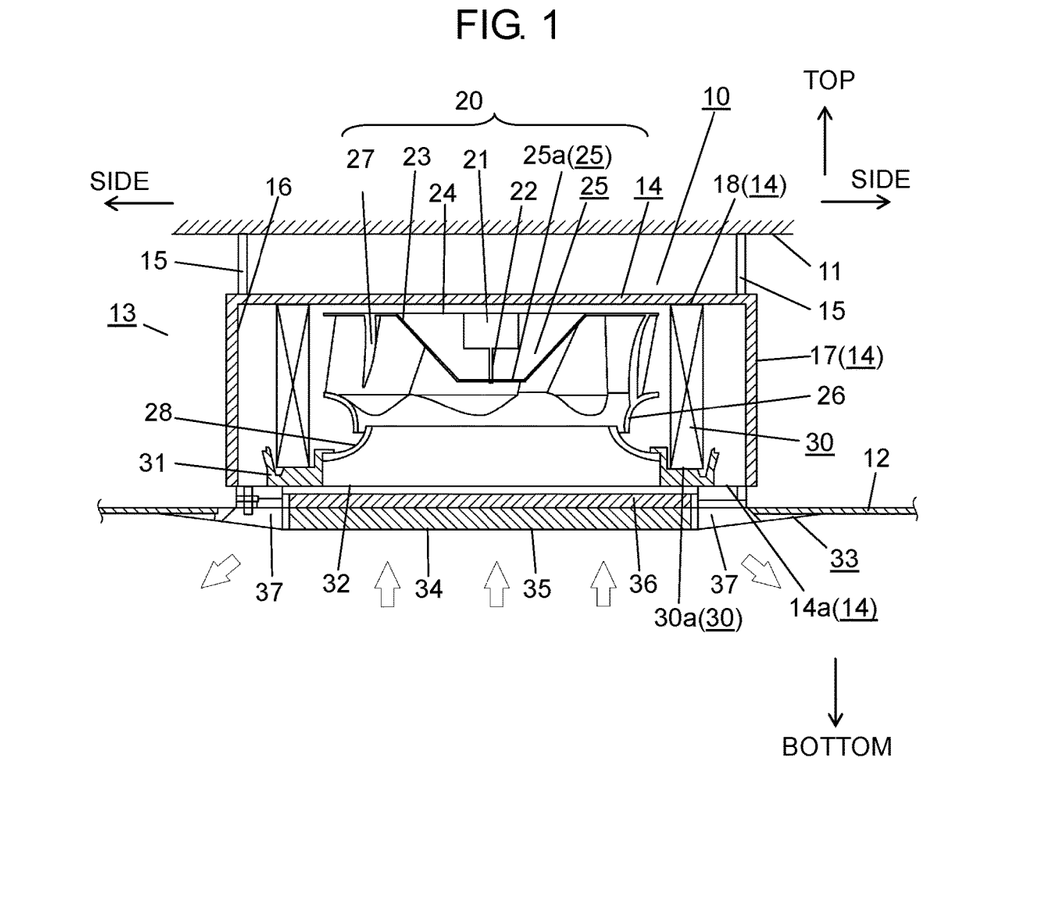
FIG. 1 illustrates a vertical cross section of an exemplary indoor unit in a room air conditioning system according to an exemplary embodiment of the present invention.
Figure 2:
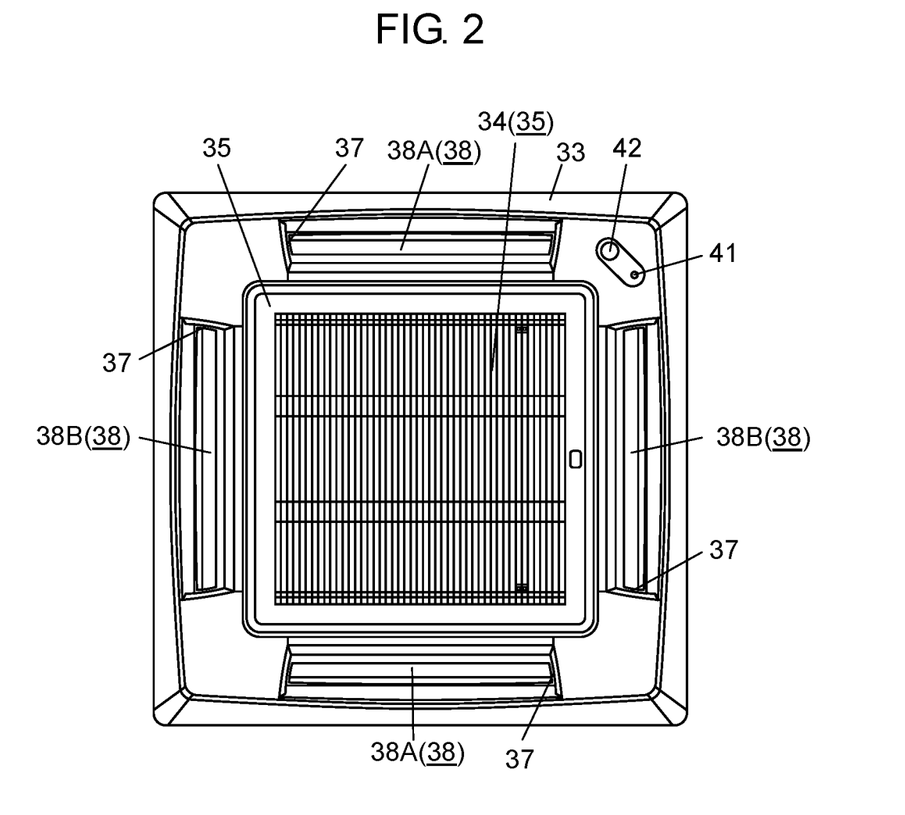
FIG. 2 is a plan view of the indoor unit as seen from the floor in a room.
Figure 3:
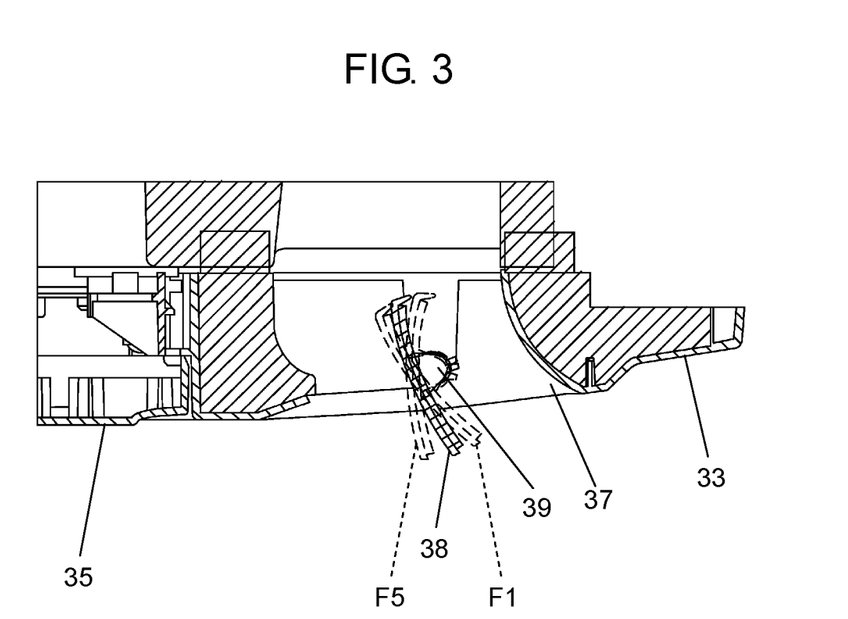
FIG. 3 is a partial cross section of the indoor unit, which is used to explain an operation of the flaps.

FIG. 1 illustrates a vertical cross section of an exemplary indoor unit in a room air conditioning system according to an exemplary embodiment of the present invention. FIG. 2 is a plan view of a decorative panel in the indoor unit as seen from the floor in a room. FIG. 3 is a partial cross section of the indoor unit, which is used to explain an operation of the flaps.

Herein, an exemplary room air conditioning system that will be described below is installed on a ceiling. The arrangement of constituent elements in the room air conditioning system will be described with reference to the "top", "bottom", and "side" in FIG. 1.

The room air conditioning system in this exemplary embodiment includes indoor unit 10 installed on ceiling 11 in a house, a building or other structures. As illustrated in FIG. 1, indoor unit 10 is positioned in ceiling space 13 between ceiling 11 and ceiling plate 12 disposed under ceiling 11.

Indoor unit 10 includes air conditioner main body 14, which has a lower surface 14a having an opening and is formed into a rectangular shape, for example. Air conditioner main body 14 is hung from ceiling 11 with hanging bolts 15.

Thermal insulating member 16, which is made of Styrofoam™, for example, is disposed inside air conditioner main body 14. Thermal insulating member 16 is in contact with the inner surface of side plate 17 of air conditioner main body 14, thereby reducing condensation on side plate 17 of air conditioner main body 14.

Fan motor 21 is mounted on the lower surface of upper plate 18 of air conditioner main body 14. Fan motor 21 extends downward and is provided with rotating shaft 22, which rotates in response to the driving of fan motor 21. The lower end of rotating shaft 22 is attached to centrifugal fan 23. Both fan motor 21 and centrifugal fan 23 constitute blower 20.

Centrifugal fan 23 has main plate 24 having a flat, circular shape. Main plate 24 has motor container 25 on the lower surface at its center, motor container 25 having a frustum shape.

Motor container 25 accommodates fan motor 21. Rotating shaft 22 of fan motor 21 extends downward with its lower end connected to bottom surface 25a of motor container 25. With the driving of fan motor 21, centrifugal fan 23 to which rotating shaft 22 is connected rotates.

Main plate 24 is provided with shroud 26 having a lower circumferential surface formed into an arc shape, for example. A plurality of vanes 27 are disposed at predetermined spacings between main plate 24 and the inner circumferential surface of shroud 26.

Orifice 28 is disposed below shroud 26. Orifice 28 is formed into a circular shape, and its circumference is formed into an arc shape, for example.

Heat exchanger 30 is disposed between blower 20 and thermal insulating member 16. Heat exchanger 30 is formed into a substantially rectangular shape (including a rectangular shape) in a plan view by bending and folding process. Heat exchanger 30 surrounds all the sides of blower 20.

During a cooling operation, heat exchanger 30 functions as an evaporator for a coolant. During a heating operation, heat exchanger 30 functions as a radiator for the coolant. Heat exchanger 30 exchanges heat between the coolant and air sucked from the room into air conditioner main body 14. During the cooling operation, heat exchanger 30 cools the air inside the air conditioning room. During the heating operation, heat exchanger 30 heats the air inside the room.

Drain pan 31 is disposed below heat exchanger 30 so as to face lower surface 30a of heat exchanger 30. Drain pan 31 receives drain water from heat exchanger 30, thus preventing the drain water from dropping onto the floor. Drain pan 31 has central suction opening 32 through which blower 20 sucks air.

As illustrated in FIG. 1 and FIG. 2, decorative panel 33 that has a substantially rectangular shape (including a rectangular shape) is attached to the lower surface of air conditioner main body 14. Decorative panel 33 covers the opening in lower surface 14a of air conditioner main body 14.

Decorative panel 33 has central suction opening 34 communicating with suction opening 32 in drain pan 31. Suction grill 35 is detachably attached to decorative panel 33 so as to cover suction opening 34. The surface of suction grill 35 which faces air conditioner main body 14 is provided with filter 36. Filter 36 captures dust or other foreign matter in air to be absorbed into air conditioner main body 14 through suction opening 34 in decorative panel 33.

Decorative panel 33 has blow-off openings 37, through which air whose temperature has been adjusted by indoor unit 10 is supplied to the interior of the room. Blow-off openings 37 are positioned outside the rectangular suction opening 34 in decorative panel 33 and along the respective four sides of decorative panel 33. When centrifugal fan 23 is rotated by fan motor 21 through rotating shaft 22, air in the room is sucked into indoor unit 10 via both suction opening 34 in decorative panel 33 and suction opening 32 in drain pan 31. Then, dust and other foreign matter are removed from the air by filter 36. After having entered indoor unit 10, the air passes through heat exchanger 30 while being subjected to the heat exchange, so that the temperature of the air is adjusted. The resultant air is returned to the interior of the room through blow-off openings 37 in decorative panel 33, thereby adjusting the room temperature.

As illustrated in FIG. 2 and FIG. 3, flaps 38, each of which can change a direction of airflow, are provided in respective blow-off openings 37 formed along the four sides of decorative panel 33. Hereinafter, when the flaps are collectively indicated, the flaps are referred to as flaps 38, whereas when the flaps are individually indicated as opposing pairs of flaps, the flaps are referred to as flaps 38A and 38B.

In this exemplary embodiment, flaps 38 include the opposing pair of flaps 38A (for example, a first pair of flaps) and the opposing pair of flaps 38B (for example, a second pair of flaps), in which a direction in which flaps 38A face each other is orthogonal to that in which flaps 38B face each other. Each of flaps 38 has support shafts (not illustrated) at both longitudinal ends and is attached to both short sides of a corresponding blow-off opening 37 through the support shafts. Consequently, flaps 38 are supported so as to be rotatable around the support shafts. Hinge 39 is provided on the rear surface of each flap 38 which faces air conditioner main body 14, at substantially the middle (including the middle) in a longitudinal direction. Hinges 39 are driven by flap driving motor 40 (see FIG. 5). Flaps 38 thereby can rotate independently of one another by flap driving motor 40.

In this exemplary embodiment, as illustrated in FIG. 3, the angle of each flap 38 can change in five stages ranging from first stage (F1) to fifth stage (F5), so that a direction of airflow from each blow-off opening 37 is adjusted. In first stage (F1), the angle of flap 38 is set to the smallest value with respect to the horizontal plane, so that air flows horizontally. In fifth stage (F5), the angle of flap 38 is set to the largest value, namely, approximately 90 degrees with respect to the horizontal surface, so that air blows directly downward. Second stage (F2), third stage (F3), and fourth stage (F4) correspond to midway stages in which the angle of flap 38 changes stepwise in the range from the smallest value to the largest value.

As illustrated in FIG. 2, floor temperature sensor 41 and human body sensor 42 are disposed in decorative panel 33 at one corner. Floor temperature sensor 41 detects a temperature of the floor in the room. Human body sensor 42 detects whether a person is present in the room or where a person is.

Up to this point, the configuration of the room air conditioning system in this exemplary embodiment has been described.

Next, a description will be given below of a concrete example of placement of the room air conditioning system in this exemplary embodiment inside a room, with reference to FIG. 4.

Figure 4:
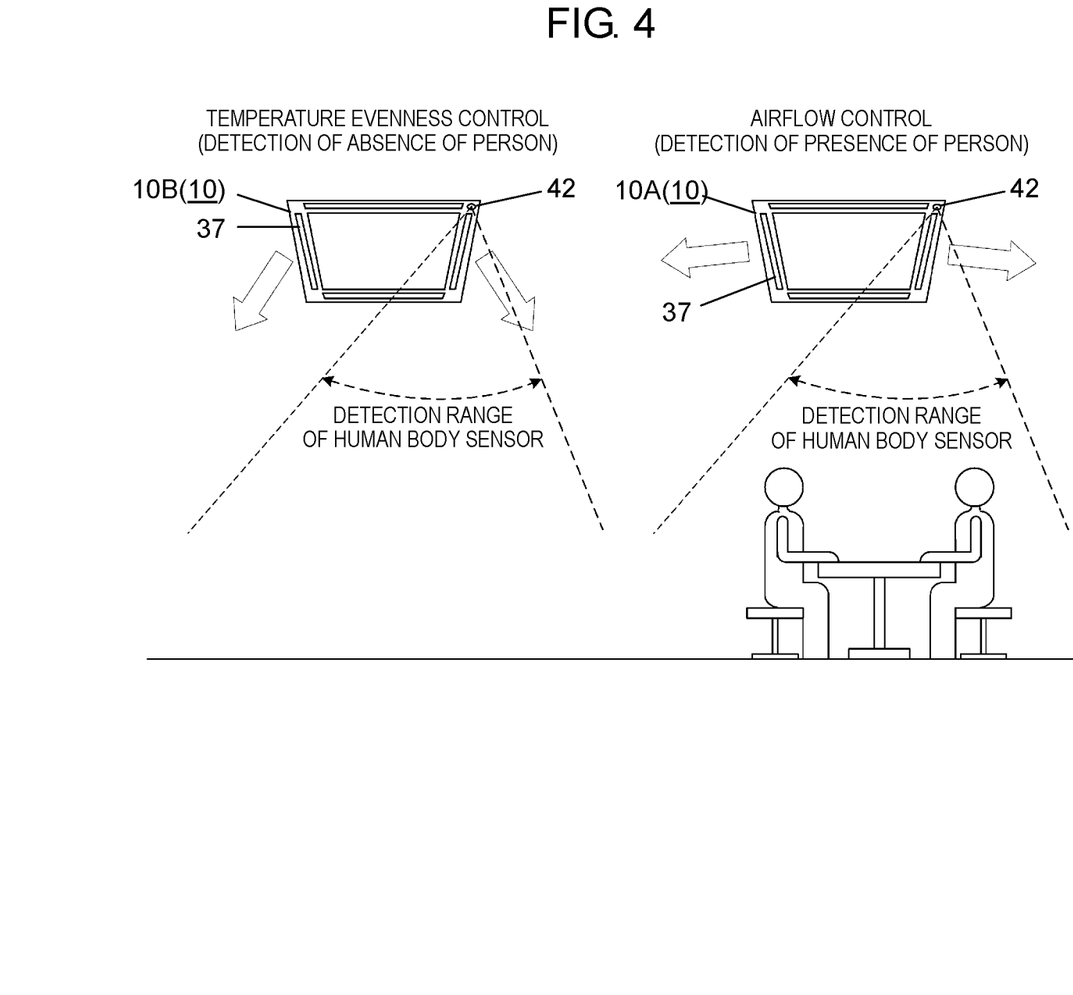
FIG. 4 illustrates the placement of indoor units.

FIG. 4 illustrates the placement of indoor units;

In a typical case, a plurality of indoor units 10 are installed on the ceiling in a single air conditioning room.

In this exemplary embodiment, as illustrated in FIG. 4, indoor units 10A and 10B are installed. Hereinafter, when the indoor units are collectively indicated, the indoor units are referred to as the indoor units 10, whereas when the indoor units are individually indicated, the indoor units are referred to as indoor units 10A and 10B.

As illustrated in FIG. 4, each of indoor units 10A, 10B has single human body sensor 42. Human body sensor 42 disposed in indoor unit 10A detects whether a person is present within a predetermined region below indoor unit 10A, and human body sensor 42 disposed in indoor unit 10B detects whether a person is present within a predetermined region below indoor unit 10B.

In this exemplary embodiment, single human body sensor 42 is disposed in each of indoor units 10A and 10B. This configuration can detect whether a person is present within the region below each of indoor units 10A and 10B.

Next, a description will be given below of a control configuration of the room air conditioning system in this exemplary embodiment, with reference to FIG. 5.

Figure 5:
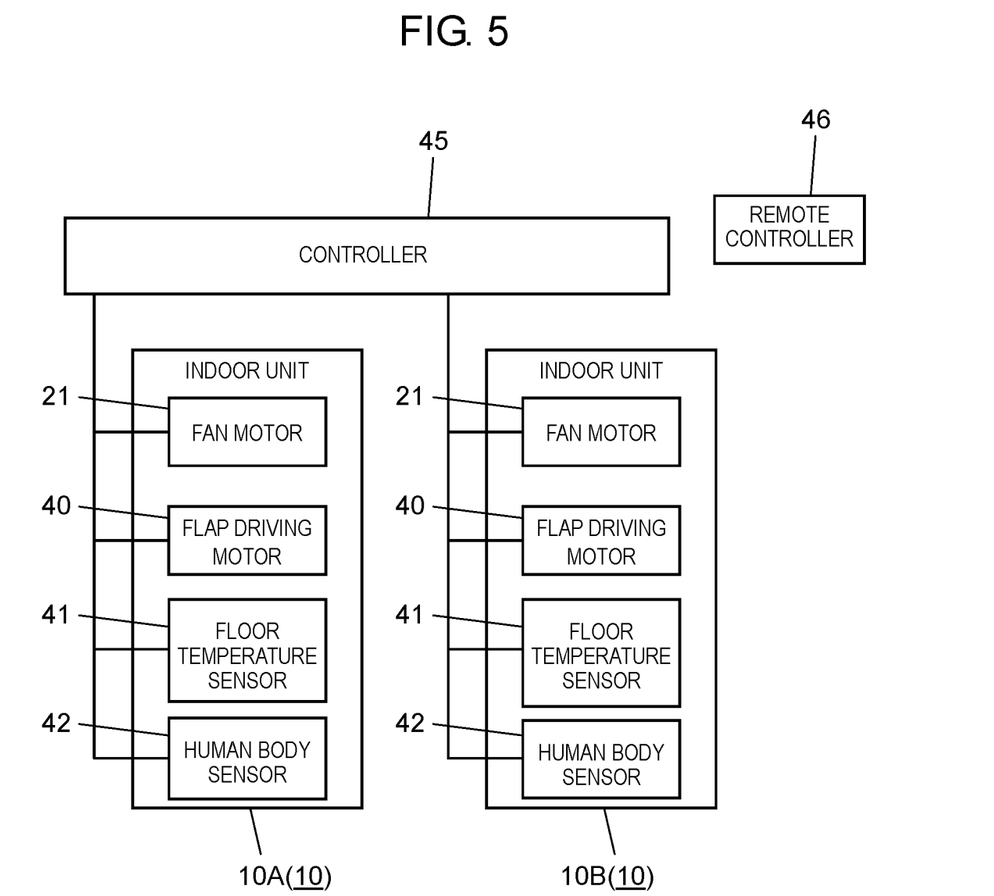
FIG. 5 is a block diagram of a control configuration of the room air conditioning system.

FIG. 5 is a block diagram of a control configuration of the room air conditioning system.

The room air conditioning system in this exemplary embodiment includes controller 45, which may be implemented using a central processing unit (CPU) and a memory, for example and operates in accordance with a predetermined program. Controller 45 controls operations of various units constituting a plurality of indoor units 10 to which controller 45 is connected. Examples of these units include fan motors 21, flap driving motors 40, floor temperature sensors 41, and human body sensors 42.

Hereinafter, the room air conditioning system includes two indoor units 10A, 10B.

Each of indoor units 10A, 10B includes: floor temperature sensor 41 that detects a temperature of the floor in the room; and human body sensor 42 that detects the presence of a person in the room.

Floor temperature sensor 41 detects a temperature of the floor in the room, and human body sensor 42 detects the presence of a person in the room. Then, both floor temperature sensor 41 and human body sensor 42 transmit the detection results to controller 45. Controller 45 controls operations of fan motor 21 and flap driving motor 40 in each of indoor units 10A, 10B, based on the received detection results.

Likewise, controller 45 determines whether persons are present at the sites below and corresponding to indoor units 10A, 10B, based on the detection results from human body sensor 42.

In the room air conditioning system in this exemplary embodiment, controller 45 can perform airflow control and temperature evenness control. The airflow control is performed such that air is not blown directly into a person in the room. The temperature evenness control is performed such that air circulates inside the room and thus reduces unevenness of room temperature. Both the airflow control and the temperature evenness control may be selected optionally by a user through an operation using remote controller 46, for example, disposed inside the room.

A description will be given below of an operation of the room air conditioning system when the user selects the airflow control by using remote controller 46.

When the user selects the airflow control, controller 45 detects whether persons are present below indoor units 10 by using respective human body sensors 42. If detecting the presence of a person below one of indoor units 10 (indoor unit 10A in FIG. 4), controller 45 controls the angles of the flaps 38 in indoor unit 10A such that air is not blown directly into the detected person. More specifically, for example, controller 45 controls flaps 38 so as to blow air at an angle ranging from first stage (F1) to third stage (F3).

Even when the airflow control is selected, if human body sensor 42 does not detect the presence of a person below another one of indoor units 10 (indoor unit 10B in FIG. 4), controller 45 causes indoor unit 10B to perform the temperature evenness control.

More specifically, as illustrated in FIG. 4, when human body sensor 42 in indoor unit 10A installed on the right side detects the presence of a person and human body sensor 42 in indoor unit 10B in indoor unit 10B installed on the left side does not detect the presence of a person, controller 45 causes indoor unit 10B to perform the temperature evenness control. In this way, the room air conditioning system successfully suppresses the person from being annoyed by airflow and reduces unevenness of the room temperature.

A description will be given below of an exemplary operation performed by the room air conditioning system in this exemplary embodiment under the temperature evenness control, with reference to FIG. 6A.

Figure 6A:
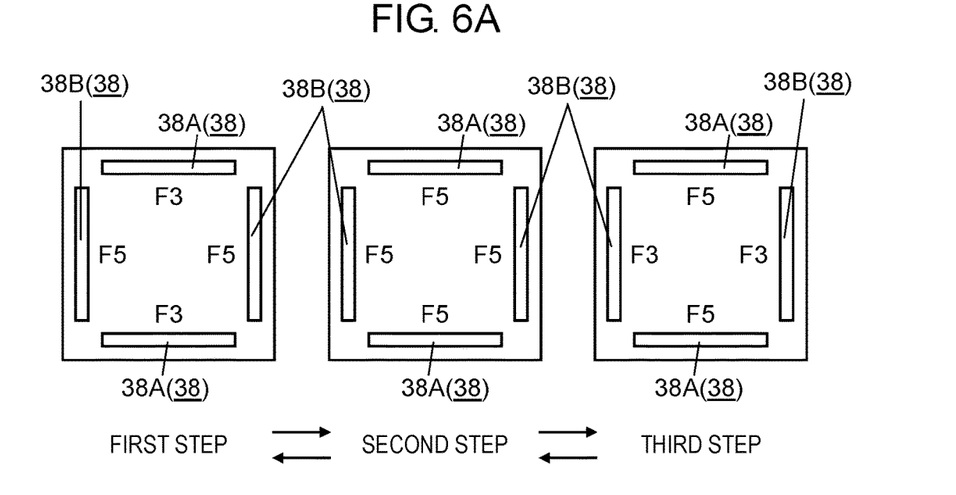
FIG. 6A illustrates an operation of the flaps under temperature evenness control according to the exemplary embodiment.

FIG. 6A illustrates an operation of the flaps under temperature evenness control in the exemplary embodiment.

Under the temperature evenness control, as illustrated in FIG. 6A, operations from a first step to a third step are performed in accordance with the angles of flaps 38.

More specifically, in the first step, the opposing pair of flaps 38B (for example, a first pair of flaps) rotates such that their angles are equal to that in fifth stage (F5), and the opposing pair of flaps 38A (for example, a second pair of flaps) rotates such that their angles are equal to that in third stage (F3). Then, indoor unit 10 blows air for a preset period (e.g., approximately 10 minutes). In the second step, all flaps 38 rotate such that their angles are equal to that in fifth stage (F5). Then, indoor unit 10 blows air for a preset period (e.g., approximately 10 minutes). At the third step, the opposing pair of flaps 38B whose angles have been set to that in fifth stage (F5) in the first step rotates such that their angles are equal to that in third stage (F3). Simultaneously, the opposing pair of flaps 38A whose angles have been set to that in third stage (F3) in the first step rotates such that their angles are equal to that in fifth stage (F5). Then, indoor unit 10 blows air for a preset period (e.g., approximately 10 minutes).

In this exemplary embodiment, first, controller 45 sequentially performs the operations in the first step, the second step, and the third step. Then, controller 45 performs the above operations in the reverse sequence, that is, sequentially performs the operations in the third step, the second step, and the first step. In short, controller 45 performs the operation in the second step at which the angles of all flaps 38 are set to that in fifth stage (F5) between the operations in the first and third steps. Performing these sequential operations in this manner successfully reduces unevenness of room temperature.

In this exemplary embodiment, in both of the first step and the third step, the angles of one pair of flaps 38 are set to that in fifth stage (F5), and the angles of the remaining pair of flaps 38 are set to that in third stage (F3); however, the angles of flaps 38 in the first and third steps are not limited.

In this exemplary embodiment, the angles in the first stage (F1) and the second stage (F2) out of the first stage (F1) to the fifth stage (F5) are set such that air is not blown directly into a person in the room. In addition, under the temperature evenness control, the angle in the third stage (F3) is used as an angle that is the smallest one of the angles at which air is blown directly into a person below indoor unit 10. Therefore, if an angle of each flap 38 is set in six or more stages, for example, the angles of one pair of flaps 38 may be set to that in fourth stage (F4) and the angles of the remaining pair of flaps 38 may be set to that in sixth stage (F6), in the first and third steps under the temperature evenness control. Alternatively, if an angle of each flap 38 is set in up to four stages, for example, the angles of one pair of flaps 38 may be set to that in second stage (F2) and the angles of the remaining pair of flaps 38 may be set to that in fourth stage (F4), in the first and third steps under the temperature evenness control.

Next, a description will be given below of another exemplary operation performed by the room air conditioning system in this exemplary embodiment under the temperature evenness control, with reference to FIG. 6B.

Figure 6B:
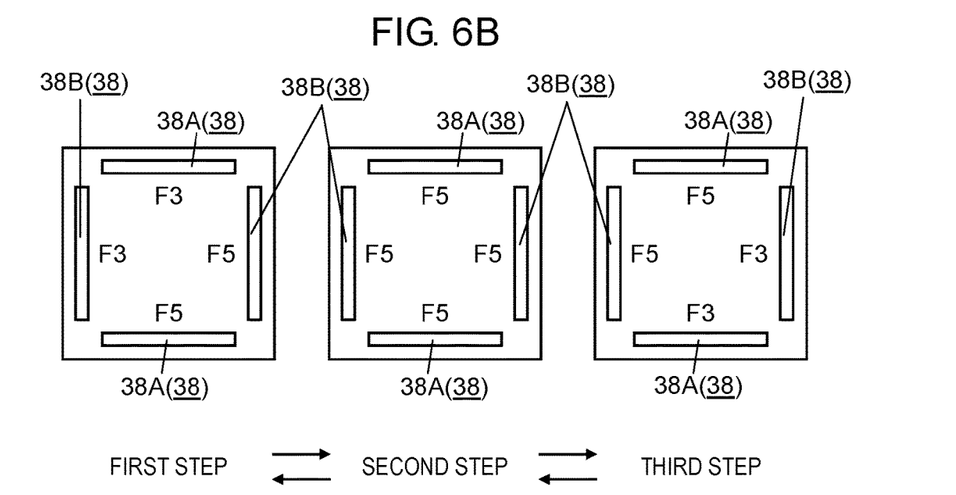
FIG. 6B illustrates another operation of the flaps under the temperature evenness control.

FIG. 6B illustrates another operation of the flaps under the temperature evenness control.

Under the temperature evenness control, as illustrated in FIG. 6B, operations from a first step to a third step are performed in accordance with the angles of flaps 38, similar to the example in FIG. 6A.

More specifically, as illustrated in FIG. 6B, in the first step, an adjacent pair of flaps 38A, 38B (for example, a first pair of flaps) rotates such that their angles are equal to that in fifth stage (F5), and the remaining adjacent pair of flaps 38A, 38B (for example, a second pair of flaps) rotates such that their angles are equal to that in third stage (F3). Then, indoor unit 10 blows air for a preset period (e.g., approximately 10 minutes). In the second step, all flaps 38 rotate such that their angles are equal to that in fifth stage (F5), similar to the example in FIG. 6A. Then, indoor unit 10 blows air for a preset period (e.g., approximately 10 minutes). In the third step, the adjacent pair of flaps 38A, 38B whose angles have been set to that in the fifth stage (F5) in the first step rotates such that their angles are equal to that in third stage (F3). Simultaneously, the adjacent pair of flaps 38A, 38B whose angles have been set to that in the third stage (F3) in the first step rotates such that their angles are equal to that in fifth stage (F5). Then, indoor unit 10 blows air for a preset period (e.g., approximately 10 minutes).

Similar to the example in FIG. 6A, first, controller 45 sequentially performs the operations in the first step, the second step, and the third step. Then, controller 45 performs the above operations in the reverse sequence, that is, sequentially performs the operations in the third step, the second step, and the first step. This successfully reduces unevenness of room temperature.

When indoor unit 10 blows air downward under the temperature evenness control in this exemplary embodiment, flaps 38 may rotate such that their angles are equal to that in fourth stage (F4) or fifth stage (F5), for example, instead of that in third stage (F3). Alternatively, flaps 38 may continue to move between the location at which their angles are equal to that in first stage (F1) and the location at which their angles are equal to that in fifth stage (F5). In short, flaps 38 may perform the so-called swing operation. This is also effective in reducing unevenness of room temperature.

Up to this point, the operation performed by the room air conditioning system in this exemplary embodiment under the temperature evenness control has been described.

Next, a description will be given below of a control operation of the room air conditioning system in this exemplary embodiment.

First, a description will be given below of a control operation of the room air conditioning system when indoor units 10 perform a heating operation, with reference to FIG. 7. In this case, for example, indoor units 10A, 10B are installed in the room as a plurality of indoor units 10, especially although indoor units 10 are not discriminated against each other.

Figure 7:
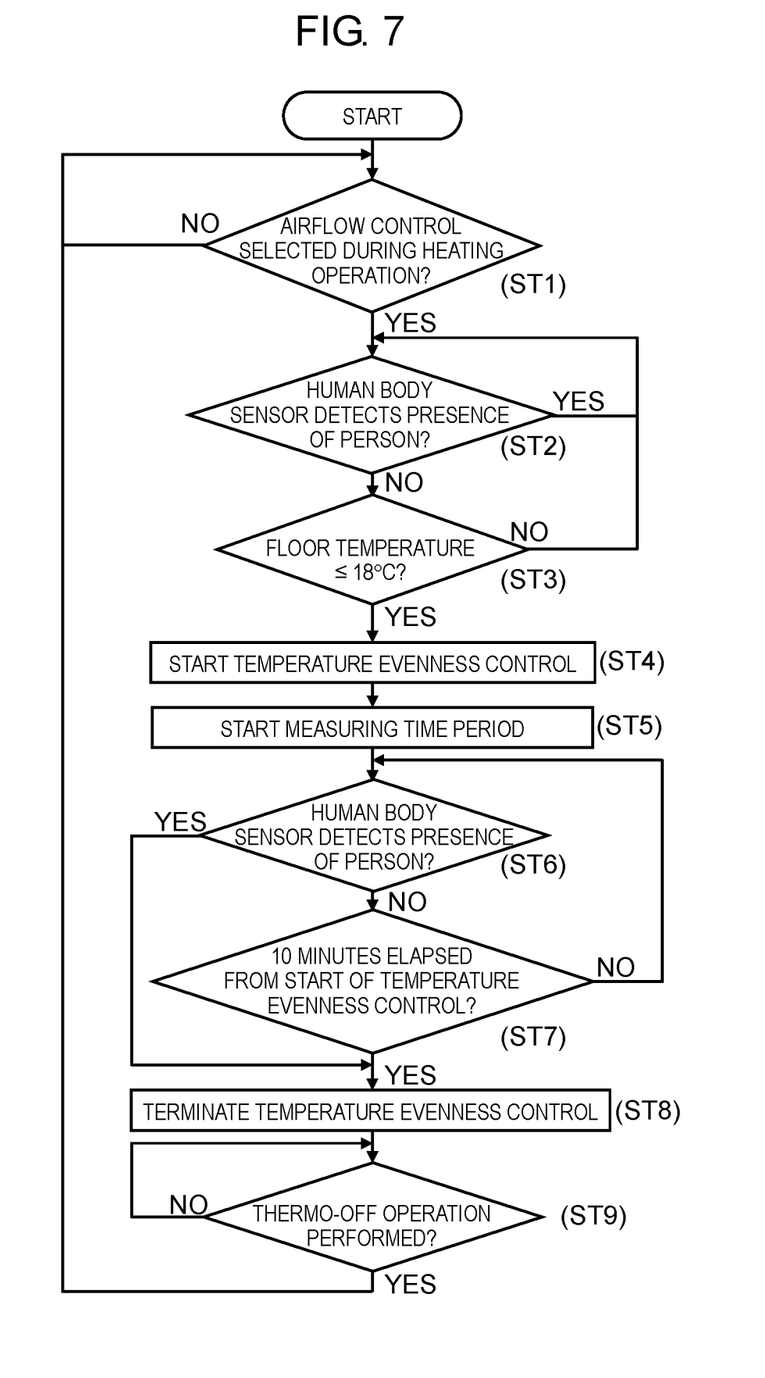
FIG. 7 is a flowchart of a control operation of the room air conditioning system when indoor units perform a heating operation.

FIG. 7 is a flowchart of a control operation of the room air conditioning system when the indoor units perform a heating operation.

As illustrated in FIG. 7, when each indoor unit 10 performs a heating operation, controller 45 determines whether the airflow control is selected (Step ST1). If the airflow control is not selected (NO at Step ST1), controller 45 waits until the airflow control has been selected.

If the airflow control is selected, namely, the ON operation is performed (YES in Step ST1), human body sensors 42 of indoor units 10 detect whether persons are present below respective indoor units 10 (Step ST2). In this case, if human body sensor 42 in each indoor unit 10 detects the presence of a person (YES in Step ST2), controller 45 waits until human body sensor 42 detects the absence of the person.

If one of human body sensors 42 in indoor units 10 does not detect the presence of a person (NO in Step ST2), floor temperature sensor 41 in indoor unit 10 in which no person is present detects whether a temperature of the floor in the room is equal to or lower than a predetermined temperature (e.g., 18° C.) (Step ST3). If the temperature of the floor in the room exceeds 18° C. (NO in Step ST3), the control operation returns to Step ST2, and the room air conditioning system performs the operation at Step ST2 and the subsequent operations.

If floor temperature sensor 41 detects that the temperature of the floor in the room is equal to or lower than 18° C. (YES in Step ST3), controller 45 starts to perform the temperature evenness control (Step ST4).

In response to the start of the temperature evenness control, controller 45 starts to measure a time period (Step ST5). While the temperature evenness control is performed, controller 45 causes human body sensor 42 to detect whether a person is present below indoor unit 10 (Step ST6). For example, if someone enters the room and thus human body sensor 42 detects his/her presence (YES in Step ST6), controller 45 terminates the temperature evenness control quickly (Step ST8).

If human body sensors 42 does not detect the presence of a person (NO in Step ST6), controller 45 determines whether a predetermined period (e.g., 10 minutes) has elapsed from the start of the temperature evenness control (Step ST7). If 10 minutes have not yet elapsed (NO at Step ST7), the control operation returns to Step ST6, and the room air conditioning system performs the operation in Step ST6 and the subsequent operations.

If 10 minutes have already elapsed (YES in Step ST7), controller 45 terminates the temperature evenness control (Step ST8).

Controller 45 determines whether the compressor in heat exchanger 30 is stopped, namely, whether the so-called thermo-off operation has been performed (Step ST9). If the thermo-off operation has not yet been performed (NO in Step ST9), controller 45 waits until the thermo-off operation has been performed.

If the thermo-off operation has already been performed (YES at Step ST9), the control operation returns to Step ST1, and the room air conditioning system continues to perform the operation in Step ST1 and the subsequent operations.

In this way, the control operation is performed during the heating operation.

Next, a description will be given below of a control operation of the room air conditioning system when indoor units 10 perform a cooling operation, with reference to FIG. 8. In this case, for example, indoor units 10A, 10B are installed in the room as a plurality of indoor units 10, although indoor units 10 are not especially discriminated against each other.

Figure 8:
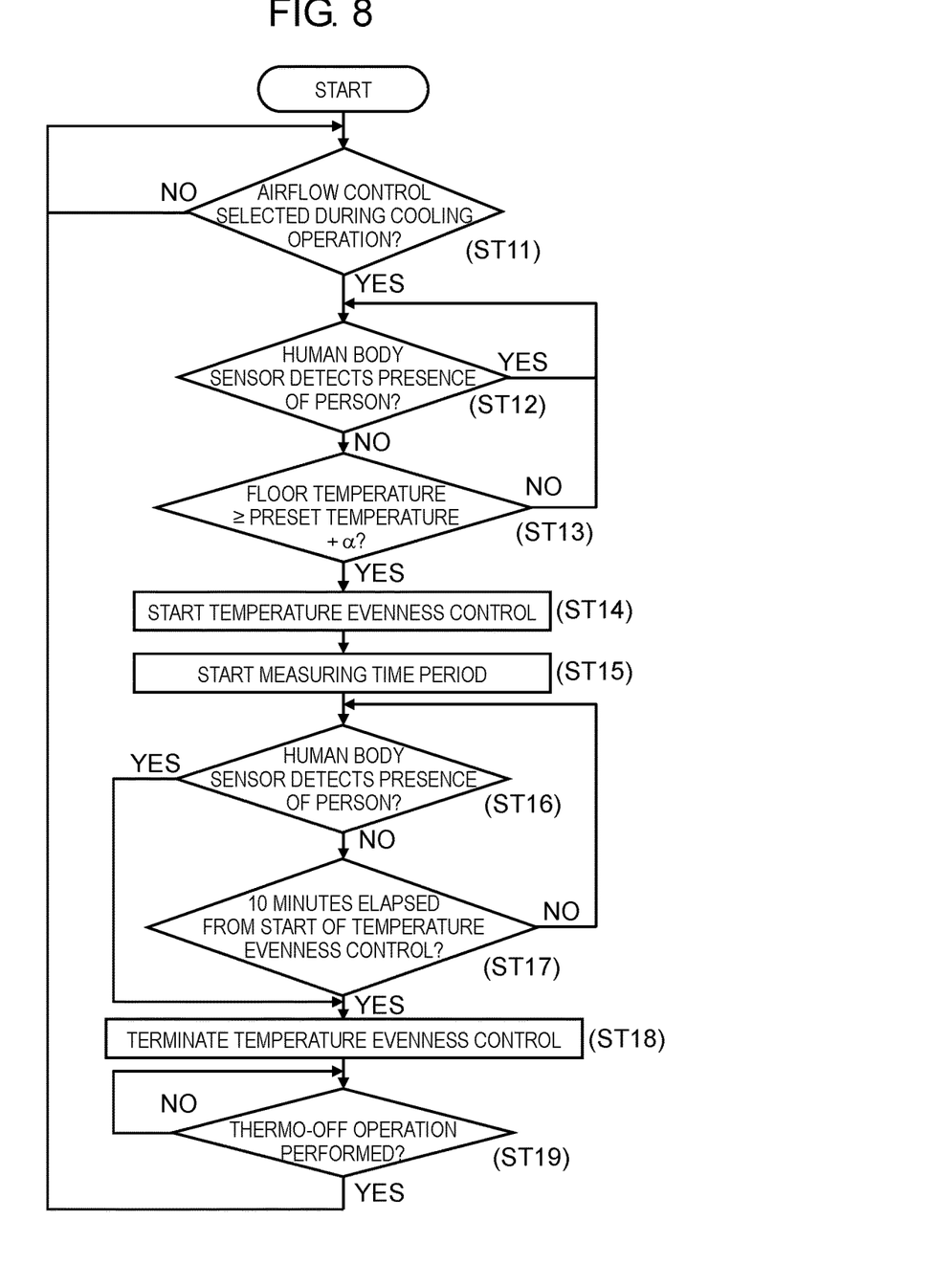
FIG. 8 is a flowchart of a control operation of the room air conditioning system when the indoor units perform a cooling operation.

FIG. 8 is a flowchart of a control operation of the room air conditioning system when the indoor units perform a cooling operation.

As illustrated in FIG. 8, when indoor units 10 perform a cooling operation, controller 45 determines whether the airflow control is selected (Step ST11). If the airflow control is not selected (NO at Step ST11), controller 45 waits until the airflow control has been selected.

If the airflow control, or an ON operation, is selected (YES in Step ST11), human body sensors 42 of indoor units 10 detect whether persons are present below respective indoor units 10 (Step ST12). In this case, if human body sensor 42 in each indoor unit 10 detects the presence of a person (YES in Step ST12), controller 45 waits until human body sensor 42 detects the absence of the person.

If one of human body sensors 42 in indoor units 10 does not detect the presence of a person (NO in Step ST12), floor temperature sensor 41 in indoor unit 10 in which no person is present detects a temperature of the floor in the room (Step ST13).

More specifically, controller 45 causes floor temperature sensor 41 to detect whether a temperature of the floor in the room is a predetermined temperature (e.g., a preset temperature+α; α is in the range from approximately 2° C. to approximately 3° C.) (Step ST13). If the floor temperature is lower than the predetermined temperature (NO in Step ST13), the control operation returns to Step ST12, and the room air conditioning system performs the operation in Step ST12 and the subsequent operations.

If floor temperature sensor 41 detects that the floor temperature is equal to or higher than the predetermined temperature (YES in Step ST13), controller 45 starts the temperature evenness control (Step ST14).

In response to the start of the temperature evenness control, controller 45 starts to measure a time period (Step ST15). While the temperature evenness control is performed, controller 45 causes human body sensor 42 to detect whether a person is present below indoor unit 10 (Step ST16). If detecting the presence of a person (YES in Step ST16), controller 45 terminates the temperature evenness control quickly (Step ST18).

If human body sensor 42 does not detect the presence of a person (NO in Step ST16), controller 45 determines whether a preset period (e.g., 10 minutes) has elapsed from the start of the temperature evenness control (Step ST17). If 10 minutes have not yet elapsed (NO at Step ST17), the control operation returns to Step ST16, and the room air conditioning system performs the operation in Step ST16 and the subsequent operations.

If 10 minutes have already elapsed (YES at Step ST17), controller 45 terminates the temperature evenness control (Step ST18).

Controller 45 determines whether the compressor in heat exchanger 30 is stopped, namely, whether the so-called thermo-off operation has been performed (Step ST19). If the thermo-off operation has not yet been performed (NO at Step ST19), controller 45 waits until the thermo-off operation has been performed.

If the thermo-off operation has already been performed (YES in Step ST19), the control operation returns to Step ST11, and the room air conditioning system performs the operation in Step ST11 and the subsequent operations again.

In this way, the control operation is performed during the cooling operation.

In the foregoing exemplary embodiment, controller 45 terminates the temperature evenness control after a predetermined period has elapsed; however, the control operation is not limited to this example. Alternatively, for example, controller 45 may detect a floor temperature by using floor temperature sensor 41, and may terminate the temperature evenness control if the floor temperature reaches a predetermined temperature (e.g., 26° C.). This successfully reduces the risk that a user's body, especially around the foot may be overcooled during the cooling operation.

In this exemplary embodiment, when human body sensor 42 does not detect the presence of a person, indoor unit 10 in which no person is present performs the temperature evenness control; however, the control operation is not limited to this example. For example, if indoor units 10 are installed adjacent to each other and one indoor unit 10 does not detect the presence of a person, the above control operation may create following disadvantage. Specifically, for example, when indoor unit 10B does not detect the presence of a person as illustrated in FIG. 4 and thus performs the temperature evenness control, air from indoor unit 10B may be blown directly into a person present below adjacent indoor unit 10A.

To reduce the risk of the above disadvantage occurring, controller 45 may control indoor unit 10B to continuously blow air with the angle of flap 38 closest to indoor unit 10A kept unchanged (e.g., kept at the angle in first stage (F1) or second stage (F2)). In addition, controller 45 may control indoor unit 10B to perform the temperature evenness control with the angles of the remaining flaps 38 in the respective blow-off openings 37 changed in the above manner. This successfully reduces the risk of blowing air directly into a person below adjacent indoor unit 10A.

In this exemplary embodiment, as described above, controller 45 detects whether persons are present below respective indoor units 10 by using human body sensors 42, with the airflow control being selected. Then, if not detecting the presence of a person, indoor unit 10 in which no person is present performs the temperature evenness control. This successfully reduces the risk of blowing air directly into a person while reducing unevenness of room temperature.

In this exemplary embodiment, when not detecting the presence of a person, controller 45 performs a control operation, based on a temperature of the floor in the room which is detected by floor temperature sensor 41. More specifically, when the floor temperature is lower than a predetermined temperature (e.g., 28° C.) during the heating operation or when the floor temperature is higher than another predetermined temperature (e.g., 25° C.) during the cooling operation, indoor unit 10 that does not detect the presence of a person performs the temperature evenness control. In short, when a floor temperature is considerably different from a preset temperature, indoor unit 10 performs the temperature evenness control. This successfully reduces unevenness of room temperature efficiently.

In this exemplary embodiment, controller 45 terminates the temperature evenness control after a predetermined time period has elapsed from the start of the temperature evenness control. This successfully reduces the risk that controller 45 may excessively perform the temperature evenness control.

In this exemplary embodiment, when detecting the presence of a person by using human body sensor 42 during the temperature evenness control, controller 45 terminates the temperature evenness control. This successfully reduces the risk of blowing air directly into a person.

Up to this point, the exemplary embodiment of the present invention has been described with reference to the accompanying drawings. However, the present invention is not limited to this exemplary embodiment, and the exemplary embodiment can undergo various modifications without departing from the spirit of the invention.

A room air conditioning system, as described above, according to an exemplary embodiment of the present invention includes: a plurality of indoor units to be installed on a ceiling; and a controller that causes the plurality of indoor units to perform airflow control and temperature evenness control. Each of the plurality of indoor units includes: an air conditioner main body; a plurality of flaps; and a human body sensor. A lower surface of the air conditioner main body has a periphery along which a plurality of blow-off openings are formed. The plurality of flaps are rotatably disposed in the respective blow-off openings and are capable of independently changing vertical angles of airflows. The human body sensor detects whether a person is present below a corresponding one of the plurality of indoor units. When at least one of the human body sensors in the plurality of indoor units detects the absence of a person with the airflow control being selected, the controller causes a corresponding one of the indoor units which detects the absence to perform the temperature evenness control. In this way, the room air conditioning system can reduce the risk of blowing air directly into a person while reducing unevenness of room temperature.

In the foregoing room air conditioning system, each of the plurality of indoor units preferably further includes a floor temperature sensor that detects a temperature of a floor in a room. When the absence of a person is detected and at least one of the floor temperature sensors detects a state that the temperature of the floor in the room is lower than a predetermined temperature during a heating operation or higher than a predetermined temperature during a cooling operation, the controller causes a corresponding one of the indoor units that detects the state to perform the temperature evenness control. In this way, the room air conditioning system can reduce unevenness of room temperature efficiently.

In the foregoing room air conditioning system, the controller may terminate the temperature evenness control after a predetermined time period has elapsed from a start of the temperature evenness control. In this way, the room air conditioning system can reduce the risk that the controller may excessively perform the temperature evenness control, thereby operating efficiently.

In the foregoing room air conditioning system, when the human body sensor of the indoor unit performing the temperature evenness control detects the presence of a person, the controller may terminate the temperature evenness control. In this way, the room air conditioning system can reduce the risk of blowing air directly into a person.

In the foregoing room air conditioning system, the plurality of flaps preferably include a first pair of flaps opposing each other and a second pair of flaps opposing each other, the first pair of flaps and the second pair of flaps being disposed perpendicularly to each other.

In the room air conditioning system, the controller may perform the temperature evenness control by sequentially performing: a first step of positioning, of the plurality of flaps, the first pair of flaps at an angle of the lowest location and the second pair of flaps at an angle of a middle location; a second step of positioning all of the plurality of flaps at the angle of the lowest location; and a third step of positioning the first pair of flaps at the angle of the middle location and the second pair of flaps at the angle of the lowest location.

In the room air conditioning system, the plurality of flaps preferably include a first pair of flaps disposed adjacent to each other and a second pair of flaps disposed adjacent to each other. The controller may perform the temperature evenness control by sequentially performing: a first step of positioning, of the first and second pairs, the first pair of flaps at an angle of the lowest location and the second pair of flaps at an angle of a middle location; a second step of positioning all of the plurality of flaps at the angle of the lowest location; and a third step of positioning the first pair of flaps at the angle of the middle location and the second pair of flaps at the angle of the lowest location.

In the above ways, the room air conditioning system can reduce the risk of blowing air directly into a person while reducing unevenness of room temperature efficiently.

What is claimed is:

1. A room air conditioning system comprising:
   an indoor unit configured to be installed on a ceiling; and
   a controller operable to cause the indoor unit to perform airflow control and temperature evenness control,
   wherein the indoor unit includes: an air conditioner main body having a lower surface that has a periphery along which a plurality of blow-off openings are formed; a plurality of flaps rotatably disposed in the plurality of blow-off openings, respectively, the plurality of flaps being capable of independently changing angles of airflows from the indoor unit with respect to a horizontal plane; and a human body sensor that detects whether a person is present below the indoor unit,
   wherein the controller is operable, when the human body sensor detects an absence of the person below the indoor unit, to cause the indoor unit to perform the temperature evenness control, and
   wherein the controller is further operable, while causing the indoor unit to perform the temperature evenness control, to cause the indoor unit to blow air for a preset period with all of the flaps positioned at the largest angle with respect to the horizontal plane.

2. The room air conditioning system according to claim 1,
   wherein the plurality of flaps include a first pair of flaps opposing each other and a second pair of flaps opposing each other, the first pair of flaps and the second pair of flaps being disposed perpendicularly to each other,
   the controller is further operable, under the temperature evenness control, to cause the indoor unit to sequentially blow air for a preset period with the first pair of flaps positioned at the smallest angle with respect to the horizontal plane, to blow air for a preset period with all of the flaps positioned at the largest angle with respect to the horizontal plane, to blow air for a preset period with the second pair of flaps positioned at the smallest angle with respect to the horizontal plane, and to blow air for a preset period with all of the flaps positioned at the largest angle with respect to the horizontal plane.

3. A room air conditioning system comprising:
a first indoor unit configured to be installed at a first location on a ceiling;
a second indoor unit configured to be installed at a second location on the ceiling; and
a controller operable to cause the first indoor unit and the second indoor unit to perform airflow control and temperature evenness control,
wherein the first indoor unit includes: a first air conditioner main body having a first lower surface that has a first periphery along which a first plurality of blow-off openings are formed; a first plurality of flaps rotatably disposed in the first plurality of blow-off opening, respectively, the first plurality of flaps being capable of independently changing angles of airflows from the first indoor unit with respect to a horizontal plane; and a first human body sensor that detects whether a first person is present in a first area below the first indoor unit,
wherein the second indoor unit includes: a second air conditioner main body having a second lower surface that has a second periphery along which a second plurality of blow-off openings are formed; a second plurality of flaps rotatably disposed in the second plurality of blow-off openings, respectively, the second plurality of flaps being capable of independently changing angles of airflows from the second indoor unit with respect to the horizontal plane; and a second human body sensor that detects whether a second person is present in a second area below the second indoor unit, and
wherein the controller is operable, when the first human body sensor detects the first person in the first area below the first indoor unit and when the second human body sensor detects an absence of the second person in the second area below the second indoor unit, to cause the second plurality of flaps to change angles of airflows from the second indoor unit with respect to the horizontal plane so as to prevent airflows from being directed from the second indoor unit toward the first area below the first indoor unit.

4. The room air conditioning system according to claim 3, wherein the second indoor unit further includes a floor temperature sensor operable to detect a temperature of a floor in a room, and
wherein when the second human body sensor detects absence of the second person and the floor temperature sensor detects a state that the temperature of the floor in the room to be lower than a predetermined temperature during a heating operation or the floor temperature sensor detects a state that the temperature of the floor in the room to be higher than a predetermined temperature during a cooling operation, the controller is operable to cause the second indoor unit to perform the temperature evenness control.

5. The room air conditioning system according to claim 3, wherein the controller is operable to terminate the temperature evenness control after a predetermined time period has elapsed from a start of the temperature evenness control.

6. The room air conditioning system according to claim 3, wherein when the first human body sensor detects presence of the first person, the controller is operable to terminate the temperature evenness control.

7. The room air conditioning system according to claim 3, wherein the second plurality of flaps include a first pair of flaps opposing each other and a second pair of flaps opposing each other, the first pair of flaps and the second pair of flaps being disposed perpendicularly to each other.

8. The room air conditioning system according to claim 7, wherein the controller is operable to perform temperature evenness control by sequentially: controlling the second indoor unit to position, of the second plurality of flaps, the first pair of flaps at a lowest location angle and a second pair of flaps at a middle location angle; then controlling the second indoor unit to position all of the second plurality of flaps at the lowest location angle; and then controlling the second indoor unit to position the first pair of flaps at the middle location angle and to position the second pair of flaps at the lowest location angle.

9. The room air conditioning system according to claim 3,
wherein the second plurality of flaps include a first pair of flaps being disposed adjacent to each other and a second pair of flaps being disposed adjacent to each other, and
wherein the controller is operable to perform temperature evenness control by sequentially: controlling the second indoor unit to position the first pair of flaps at a lowest location angle and the second pair of flaps at a middle location angle; then controlling the second indoor unit to position all of the second plurality of flaps at the lowest location angle; and then controlling the second indoor unit to position the first pair of flaps at the middle location angle and the second pair of flaps at the lowest location angle.

10. A method of controlling a room air conditioning system comprising: a first indoor unit configured to be installed at a first location on a ceiling; a second indoor unit configured to be installed at a second location on the ceiling; and a controller operable to cause the first indoor unit and the second indoor unit to perform airflow control and temperature evenness control, wherein the first indoor unit includes: a first air conditioner main body having a first lower surface that has a first periphery along which a first plurality of blow-off openings are formed; a first plurality of flaps rotatably disposed in the first plurality of blow-off opening, respectively, the first plurality of flaps being capable of independently changing angles of airflows from the first indoor unit with respect to a horizontal plane; and a first human body sensor that detects whether a first person is present in a first area below the first indoor unit, wherein the second indoor unit includes: a second air conditioner main body having a second lower surface that has a second periphery along which a second plurality of blow-off openings are formed; a second plurality of flaps rotatably disposed in the second plurality of blow-off openings, respectively, the second plurality of flaps being capable of independently changing angles of airflows from the second indoor unit with respect to the horizontal plane; and a second human body sensor that detects whether a second person is present in a second area below the second indoor unit, and wherein the controller is operable, when the first human body sensor detects the first person in the first area below the first indoor unit and when the second human body sensor detects an absence of the second person in the second area below the second indoor unit, to cause the second plurality of flaps to change angles of airflows from the second indoor unit with respect to the horizontal plane so as to prevent airflows from the second indoor unit to be directed toward the first area below the first indoor unit, said method comprising:

detecting, via the first human body sensor, the first person present in the first area below the first indoor unit;

detecting, via the second human body sensor, an absence of the second person present in a second area below the second indoor unit; and causing, via the controller, the first indoor unit and the second indoor unit to perform airflow control and temperature evenness control by causing the second plurality of flaps to change angles of airflows from the second indoor unit with respect to the horizontal plane so as to prevent airflows from the second indoor unit to be directed from the second indoor unit toward the first area below the first indoor unit.

11. The method according to claim 10, further comprising:

detecting, via a floor temperature sensor at the second indoor unit, a temperature of a floor in a room, wherein the controlling, via the controller, the first indoor unit and the second indoor unit to perform airflow control and temperature evenness control further comprises causing, via the controller when the second human body sensor detects absence of the second person and the floor temperature sensor detects a state that the temperature of the floor in the room to be lower than a predetermined temperature during a heating operation or the floor temperature sensor detects a state that the temperature of the floor in the room to be higher than a predetermined temperature during a cooling operation, the second indoor unit to perform the temperature evenness control.

12. The method according to claim 10, further comprising terminating, via the controller, airflow control and temperature evenness control after a predetermined time period has elapsed from a start of the temperature evenness control.

13. The method according to claim 10, further comprising terminating, via the controller when the first human body sensor detects presence of the first person, airflow control and temperature evenness control.

14. The method according to claim 10, wherein the second plurality of flaps include a first pair of flaps opposing each other and a second pair of flaps opposing each other, the first pair of flaps and the second pair of flaps being disposed perpendicularly to each other.

15. The method according to claim 14, wherein the controlling, via the controller, the first indoor unit and the second indoor unit to perform airflow control and temperature evenness control comprises sequentially: controlling the second indoor unit to position, of the second plurality of flaps, the first pair of flaps at a lowest location angle and a second pair of flaps at middle location angle; then controlling the second indoor unit to position all of the second plurality of flaps at the lowest location angle; and then controlling the second indoor unit to position the first pair of flaps at the middle location angle and to position the second pair of flaps at the lowest location angle.

16. The room air conditioning system according to claim 10, wherein the second plurality of flaps include a first pair of flaps being disposed adjacent to each other and a second pair of flaps being disposed adjacent to each other, and wherein the controlling, via the controller, the first indoor unit and the second indoor unit to perform airflow control and temperature evenness control comprises sequentially: controlling the second indoor unit to position the first pair of flaps at a lowest location angle and the second pair of flaps at a middle location angle; then controlling the second indoor unit to position all of the second plurality of flaps at the lowest location angle; and then controlling the second indoor unit to position the first pair of flaps at the middle location angle and the second pair of flaps at the lowest location angle.

* * * * *